(12) United States Patent
Amman et al.

(10) Patent No.: US 9,978,399 B2
(45) Date of Patent: May 22, 2018

(54) METHOD AND APPARATUS FOR TUNING SPEECH RECOGNITION SYSTEMS TO ACCOMMODATE AMBIENT NOISE

(71) Applicant: FORD GLOBAL TECHNOLOGIES, LLC, Dearborn, MI (US)

(72) Inventors: Scott Andrew Amman, Milford, MI (US); Brigitte Frances Mora Richardson, West Bloomfield, MI (US); Allan Miramonti, Westland, MI (US); John Edward Huber, Novi, MI (US); Francois Charette, Tracy, CA (US); Gintaras Vincent Puskorius, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 14/940,761

(22) Filed: Nov. 13, 2015

(65) Prior Publication Data
US 2017/0140777 A1 May 18, 2017

(51) Int. Cl.
*G10L 25/87* (2013.01)
*G10L 25/84* (2013.01)
*G10L 15/06* (2013.01)

(52) U.S. Cl.
CPC ............ *G10L 25/87* (2013.01); *G10L 15/063* (2013.01); *G10L 25/84* (2013.01); *G10L 2015/0631* (2013.01)

(58) Field of Classification Search
CPC ....... G10L 25/84; G10L 25/87; G10L 15/063; G10L 2015/0631
See application file for complete search history.

(56) References Cited

U.S. PATENT DOCUMENTS

| | | | |
|---|---|---|---|
| 2002/0097884 A1* | 7/2002 | Cairns | G10K 11/1788 381/71.4 |
| 2002/0169613 A1 | 11/2002 | Damiba | |
| 2007/0073539 A1* | 3/2007 | Chengalvarayan | G10L 15/20 704/245 |
| 2008/0004875 A1* | 1/2008 | Chengalvarayan | G10L 15/20 704/234 |
| 2008/0188271 A1* | 8/2008 | Miyauchi | G10K 11/1788 455/569.2 |

(Continued)

Primary Examiner — Walter A Yehl
(74) Attorney, Agent, or Firm — Jennifer Stec; Brooks Kushman P.C.

(57) ABSTRACT

A system includes a head and torso simulation (HATS) system configured to play back pre-recorded audio commands while simulating a driver head location as an output location. The system also includes a vehicle speaker system and a processor configured to engage a vehicle heating, ventilation and air-conditioning (HVAC) system. The processor is also configured to play back audio commands through the HATS system while playing back pre-recorded vehicle environment noises through the speaker system. The processor is further configured to determine if the audio command, recorded by a vehicle microphone, is recognizable in the presence of the environment noises and HVAC noises. Also, the processor is configured to repeat the engagement, playback of commands and noises, and determination, recording the results of the determination for each command in a set of commands.

10 Claims, 6 Drawing Sheets

(56) References Cited

U.S. PATENT DOCUMENTS

| | | | |
|---|---|---|---|
| 2010/0017205 A1* | 1/2010 | Visser | G10L 19/00 704/225 |
| 2010/0049516 A1 | 2/2010 | Talwar et al. | |
| 2012/0053934 A1* | 3/2012 | Agapi | G10L 15/01 704/233 |
| 2013/0179164 A1* | 7/2013 | Dennis | G10L 21/0216 704/234 |
| 2013/0185066 A1* | 7/2013 | Tzirkel-Hancock | G10L 15/20 704/233 |
| 2015/0112672 A1 | 4/2015 | Giacobello et al. | |
| 2016/0019890 A1* | 1/2016 | Amman | G10L 25/60 704/233 |
| 2016/0019904 A1* | 1/2016 | Charette | G10L 25/60 704/227 |

* cited by examiner

METHOD AND APPARATUS FOR TUNING SPEECH RECOGNITION SYSTEMS TO ACCOMMODATE AMBIENT NOISE

TECHNICAL FIELD

The illustrative embodiments generally relate to a method and apparatus for tuning speech recognition systems to accommodate ambient noise.

BACKGROUND

The increasing complexity of vehicle computing systems and infotainment systems, which provide an array of options for driver customization and interaction, has been accompanied by an increasingly large number of selectable and adjustable options presented on vehicular displays. Since it is inadvisable for drivers to physically interact with complex menu systems while a vehicle is in motion, many of these features are disabled for physical interaction unless the vehicle is traveling below a certain speed or is stopped. However, voice-activated control of these menu systems is frequently provided.

Voice activated control allows a driver to focus on the road while still utilizing the upgraded features of a particular vehicle. While convenient, variances in both speech and environmental noise (e.g., engine rattle, window noise, passenger noise, etc.) makes voice commands difficult to interpret. Variances in accent and speech patterns can make interpretation difficult. The addition of background noises renders, this problem becomes even more difficult. Much effort has been devoted to better understanding driver commands to reduce any possible frustration associated with a voice-activated system that requires repeated attempts to function in an intended manner.

Certain vehicle noises are consistent at corresponding vehicle speeds and/or across vehicle lines based on cabin configuration and dampening systems. For example, there is a general interior sound that is present in almost all vehicle models of a certain configuration and model year (e.g., ambient noises present in all 2015 FORD TAURUSES). Since this is one set of noises that is known in advance, it is possible to consider these noises when performing speech pre or post processing.

SUMMARY

In a first illustrative embodiment, a system includes a head and torso simulator (HATS) system, configured to play back pre-recorded audio commands while simulating a driver head location as an output location. The system also includes a vehicle speaker system and a processor configured to engage a vehicle heating, ventilation and air-conditioning (HVAC) system. The processor is also configured to play back audio commands through the HATS system while playing back pre-recorded vehicle environment noises through the speaker system. The processor is further configured to determine if the audio commands, recorded by a vehicle microphone, are recognizable in the environment noises and HVAC noises and, for each audio command in a set of commands, repeat the engagement, play back of commands and noises, and determination, recording the results of the determination for each audio command.

In a second illustrative embodiment, a system includes a processor configured to create a record indicating a recognition rate of a set of pre-recorded audio commands played through a head and torso simulator (HATS) in a cabin of a particular vehicle model under varied ambient noise conditions generated by pre-recorded background noises played in the cabin for each of a plurality of heating, ventilation and air-conditioning (HVAC) settings.

In a third illustrative embodiment, a computer-implemented method includes creating a record, using an audio processing computer, indicating the recognition rate of a set of pre-recorded audio commands played through a head and torso simulator (HATS) in a cabin of a specific vehicle model under varied ambient noise conditions generated by pre-recorded background noises played in the cabin for each of a plurality of heating, ventilation and air-conditioning (HVAC) settings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
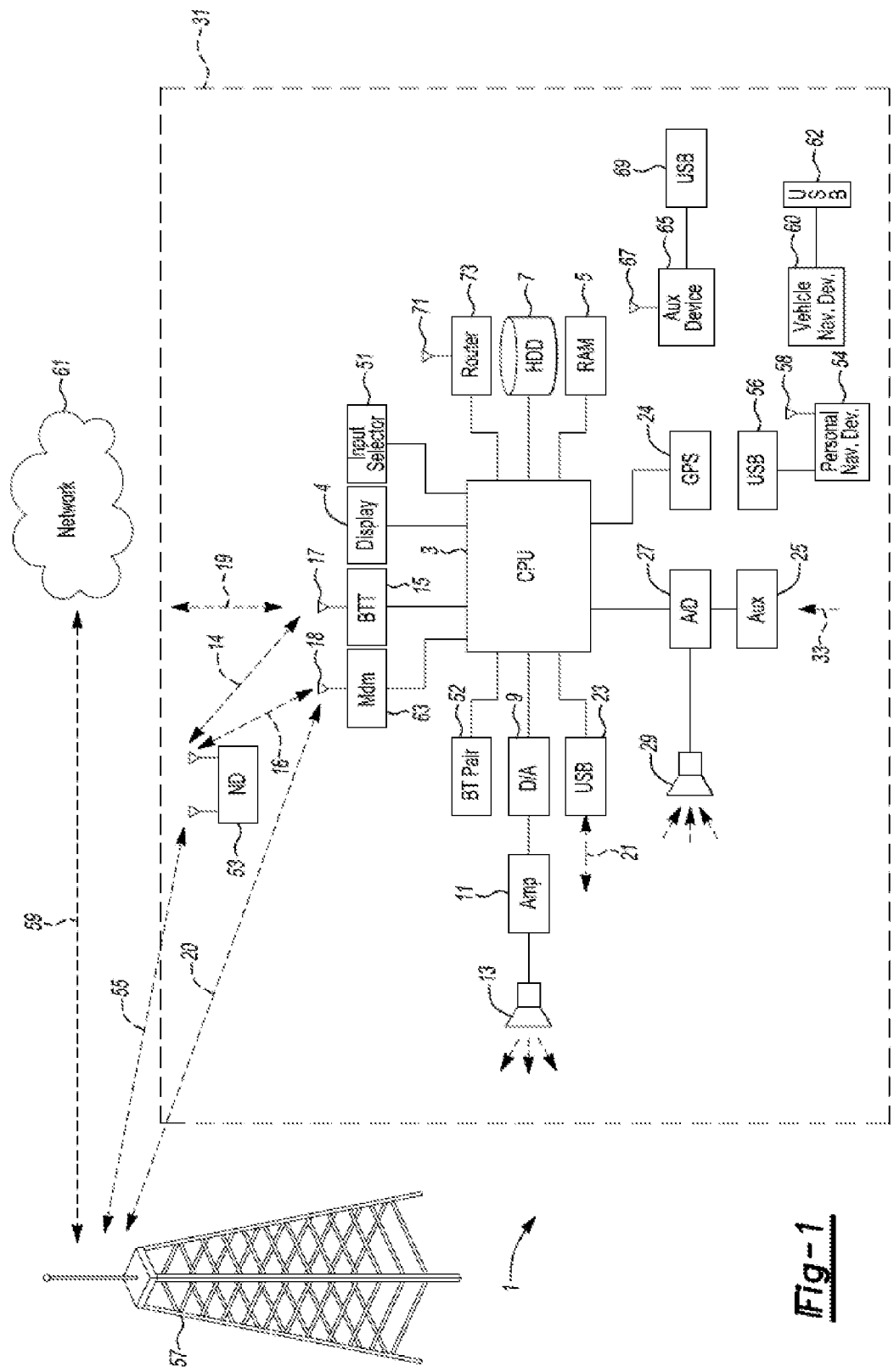
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Because cabin environments tend to be relatively uniform across all vehicles of a particular make and model, and because there is a general set of ambient noises present in the environments (which may vary from model to model, but is generally uniform across a particular make and model), some projections about what noises will be present in a particular vehicle can be made.

The illustrative embodiments propose playback of a set of voice commands that are pre-recorded, in a simulated operating environment, to obtain the sound of these commands including any ambient noise that may be present in the vehicle. This allows for accommodation of the wave form pattern adjustments caused by ambient noise, at least, and can be used to test the affects of changes to a vehicle's configuration with respect to the ability of the vehicle to process speech commands. Examples of adaptation to ambient noise and improving command processing include, but are not limited to, altering incoming sound (pre-processing), reducing HVAC settings, changing microphone directions, adaptive noise control, active noise cancellation, etc.

For example, a Model X vehicle may have certain ambient noises associated therewith. In the presence of these noises, 97% of voice commands may be accurately recognized at a low speed (this number may be diminished at higher speeds and/or with other passenger noises present). When a change to the interior configuration of the vehicle is made, resulting in additional ambient noise, this number may reduce to 94% at the same low speed. An original equipment manufacturer (OEM) would like to know about these affects resulting from the ambient noise increase, to determine if the configuration change is appropriate in light of the deterioration of speech recognition. Also, it may be possible to perform pre or post processing on the commands once the new ambient noise affects are known, to increase the percentage of command recognition, allowing for the vehicle to be reconfigured with minimal affect on voice recognition.

Figure 2:
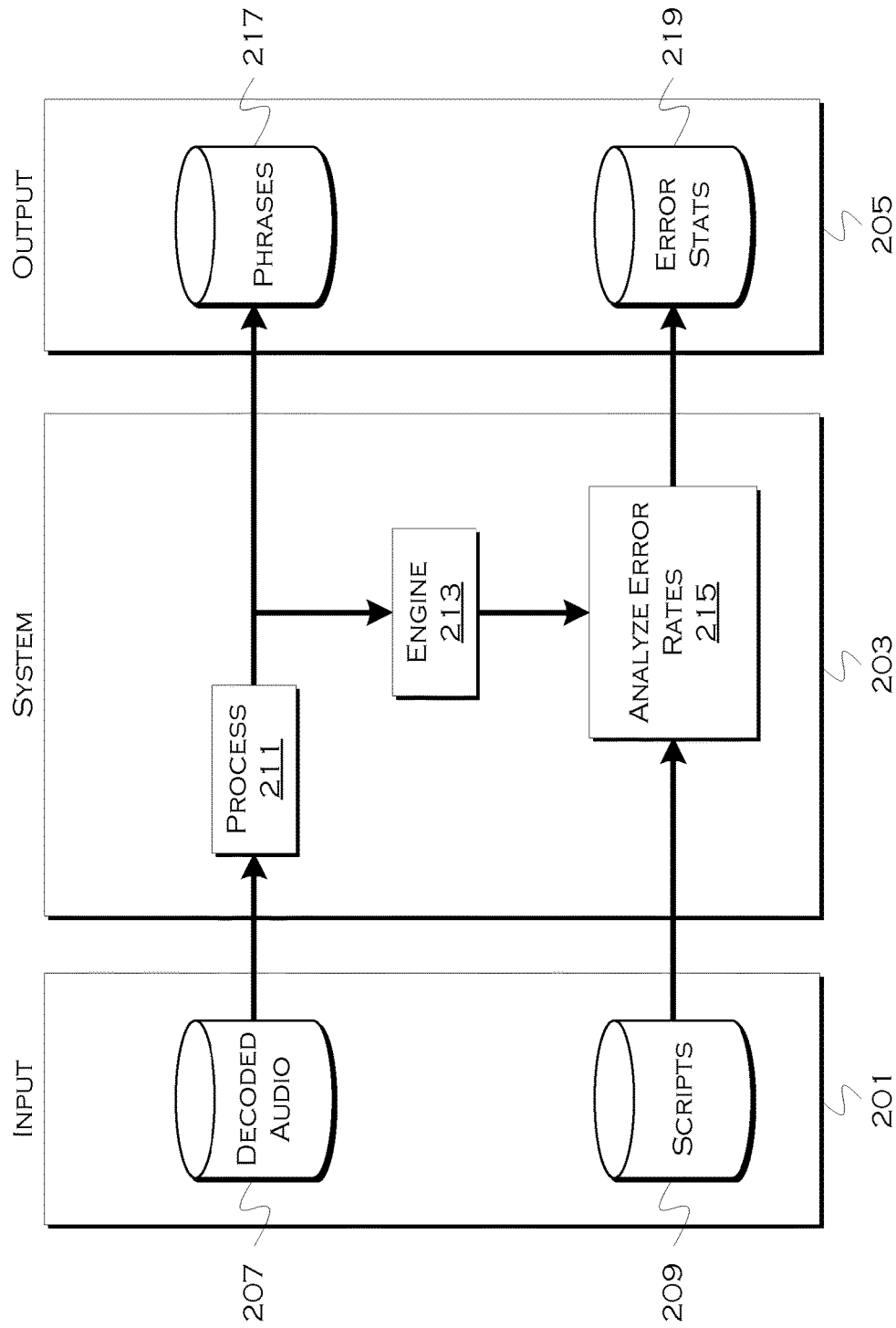
FIG. 2 shows an illustrative speech tuning system.

FIG. 2 shows an illustrative speech tuning system. In this illustrative example, a set of known vehicle audio commands played back in a noisy environment (in a vehicle, including ambient noise, HVAC, etc) is pre-recorded on a database 207 for use as an input 201 in a testing process. These are control commands, and while the functionality of a particular command is not necessarily tested in the test process, the ability of the system to recognize the command in the presence of ambient noise, produced in a simulated driving environment, is tested. For example, if the pre-recorded command "navigation" was played from the database, the system would know that the word "navigation" was expected. The system could then easily determine whether or not "navigation" was actually recognized in the presence of varied levels of ambient noise. Ambient noises for given vehicle makes and models are played back in a given vehicle environment. A script 209 which was used to create the recorded command database can provide guidance for an expected set of commands (i.e., what the inputs are supposed to correspond to).

The commands are played and any processing 211 to be done (pre-processing, post processing, etc) is performed. The result is the issuance of a known set of commands under various ambient noise conditions, and the ability of a given vehicle to recognize the commands at varied ambient noise levels can be tested. A script database provides a list of which commands are actually expected.

The system 203 receives the command input and processes 211 the commands. The processing can include, for example, cutting up, resampling, reformatting, etc. The effects of different processing on the commands can be gauged by the recognition engine 213. This could result in a certain first level of recognition.

The success of the command processing can be evaluated by looking at error rates (e.g., commands not recognized) 215, which can be analyzed for the quality of the recognition after recommended command processing. A list of phrases 217 that are or are not recognized could be stored in a database 217, as well as a record of the error statistics 219, both as outputs from the system. These outputs can be used to determine the suitability of particular pre and post processing when software or a routine for use with a given vehicle is being developed.

In a slightly more complex example, it may be the case that at under 40 miles per hour, on a paved road (both conditions which are detectable by vehicle sensors in an active vehicle), the system recognizes 85% of voice commands without any pre or post processing. But, the command "navigation" may only be recognized when a certain filter is applied. In practice, the system may receive input for that vehicle in the field, and if the command is not recognized, the system may apply the particular filter to determine if the command is a "navigation" command (the filter may also be used to recognize other commands, the point of the example being that an iterative consideration and application of filter process can be implemented, the successfulness of which can be somewhat known in advance based on testing as described herein). If the OEM were unable to test the commands and know in advance which filters resulted in recognition of which commands, a whole spate of filters might have to be used every time a command was uttered, which could result in both false positives and significant system lag as the system tried to determine what command was spoken.

The proposed testing system can also be used to test the effects of varied microphone placement in a vehicle cabin, to determine how many microphones should be placed and what locations are best for microphone placement. This may vary from model to model, depending on the acoustics of the vehicle model or make.

A non-limiting example of test conditions includes, but is not limited to:

1) Placing the HATS in a relatively low position, and for each of an heating, ventilation and air conditioning system (HVAC) fan in a low state and high state, playing the commands under the following background noise conditions:

Stationary closed vehicle; engine off
City driving @40 mph, on dry concrete
City driving @50 mph, on dry concrete
City driving @60 mph, on dry concrete
Highway driving @75 mph, on asphalt These background noises can be repeated for the full command set in each of the fan high, low and off states for the HVAC system (since the HVAC also adds ambient noise). The HATS can also be placed in a relatively high position, and the process can be repeated for each of the HVAC states for all of the background noises. Of course, these examples are intended for illustrative purposes only, and are not intended to limit the scope of the invention thereto.

Figure 3A:
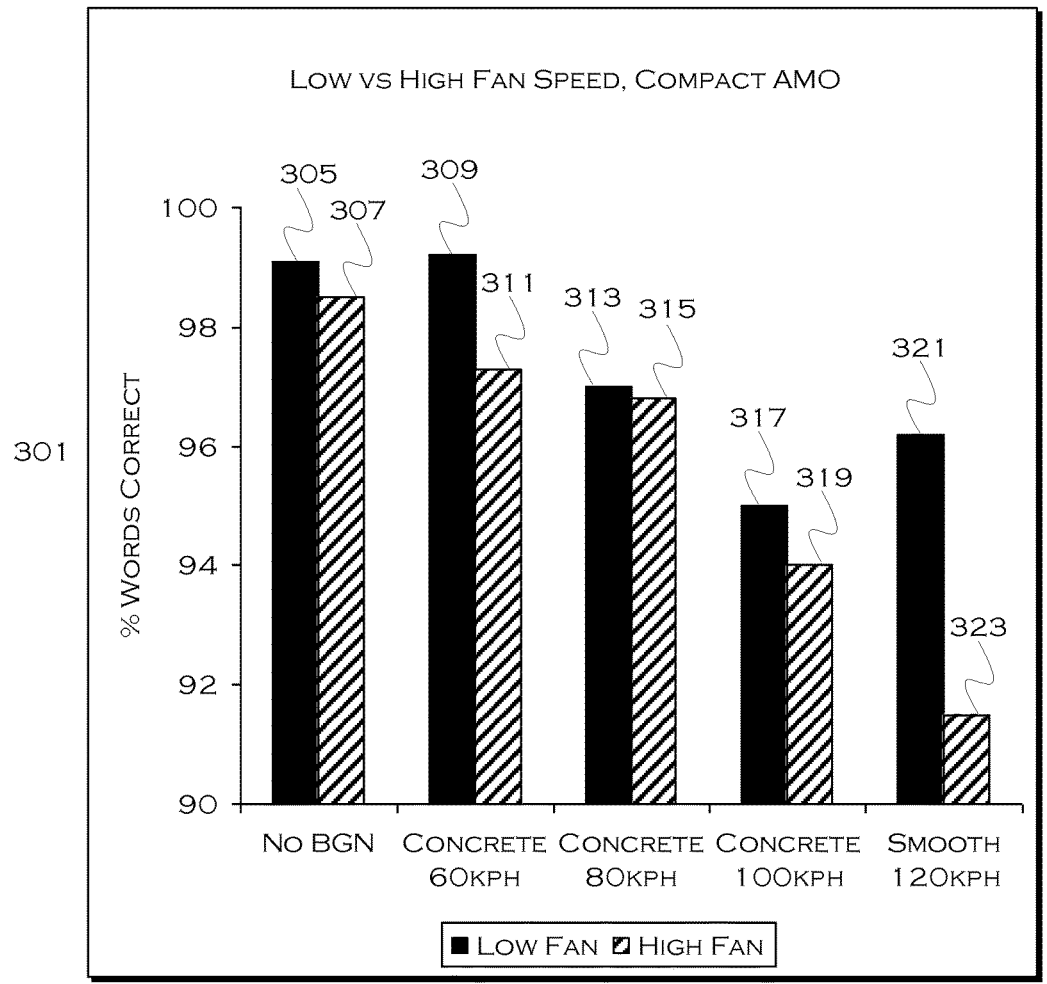
FIGS. 3A-3C show illustrative results of ambient noise and post-test processing.
Figure 3B:
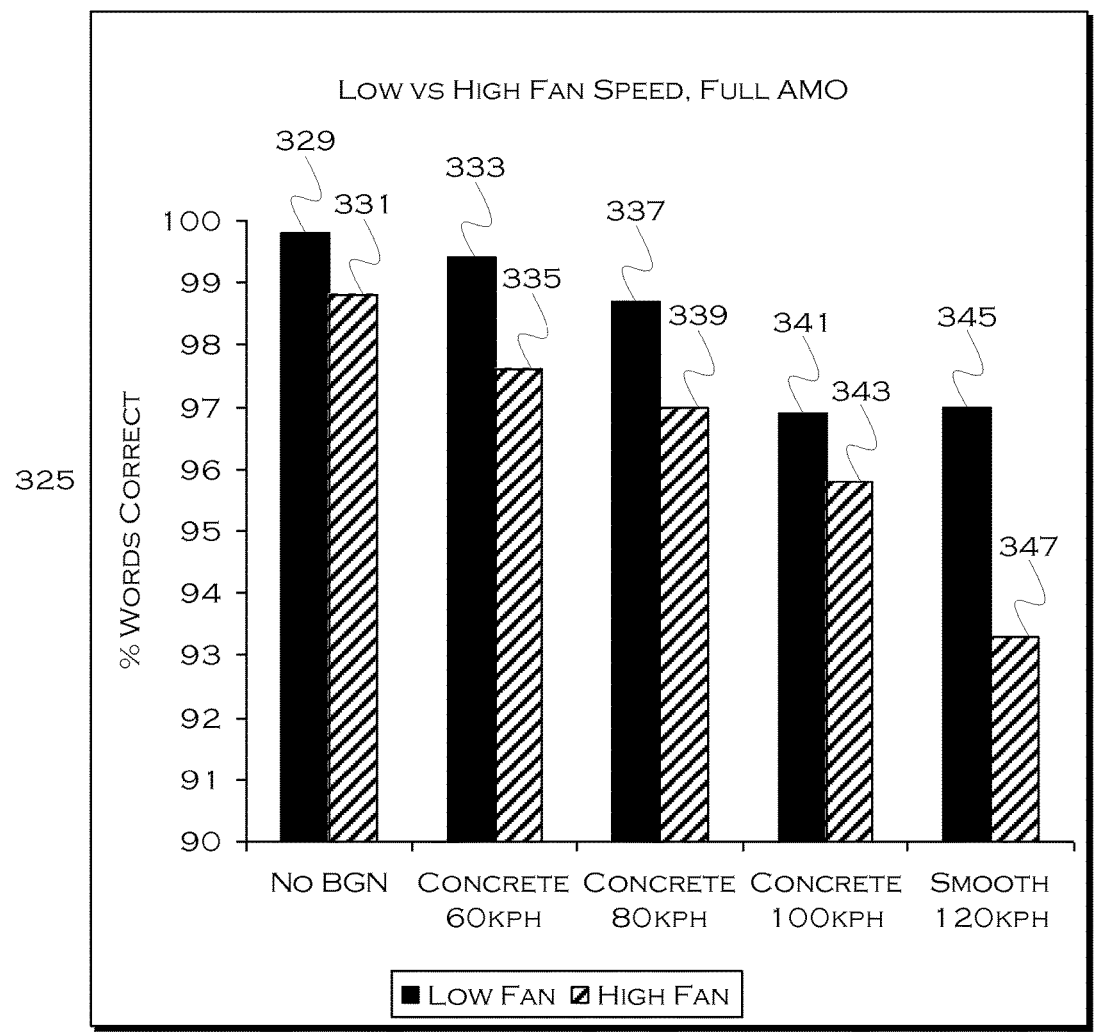
Figure 3C:
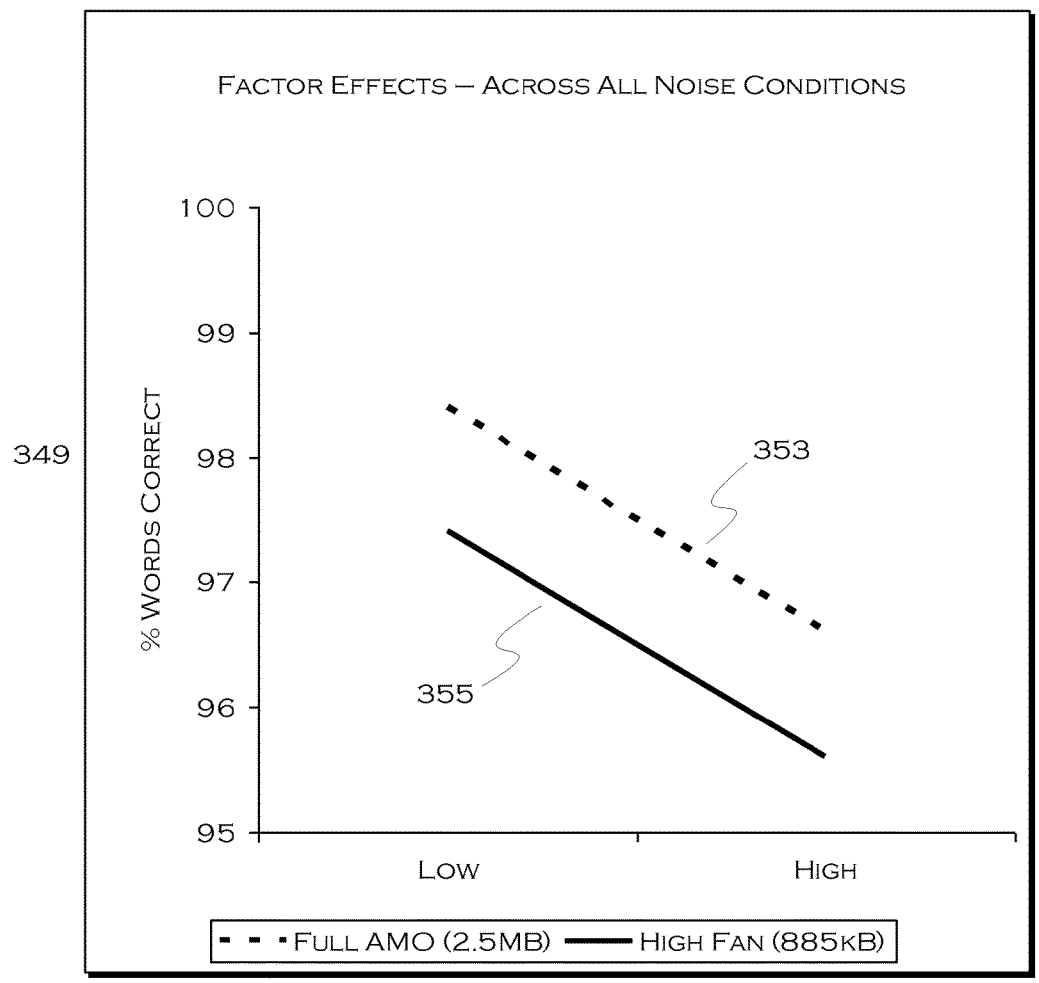

FIGS. 3A-3C show illustrative results of ambient noise and post-test processing.

In FIG. 3A, the process shows the various number of words correct 301 out of 100, for varied background noises 303. For each background noise type 303, the process shows the words correct with a fan at low speed 305, 309, 313, 317, 321 and at high speed 307, 311, 315, 319, 323. FIG. 3A shows the results for a first acoustic model and FIG. 3B shows the results for a second acoustic model. The X 323 and Y 321 axes correspond to the same data as in FIG. 3A.

As can be seen from FIG. 3B, the recognition levels at both low fan speeds 325, 329, 333, 337, 341 and at high fan speeds 327, 331, 335, 339, 343 are higher, although the second acoustic model does require more data (and thus more bandwidth to transmit).

FIG. 3C shows the factored effects on commands across a variety of noise conditions. The deterioration 345, 347 is fairly linear for both models as the noise increases, with simply a lower recognition rate for the first acoustic model. The X 343 and Y axis again correspond to noise levels and words-recognized, respectively.

Figure 4:
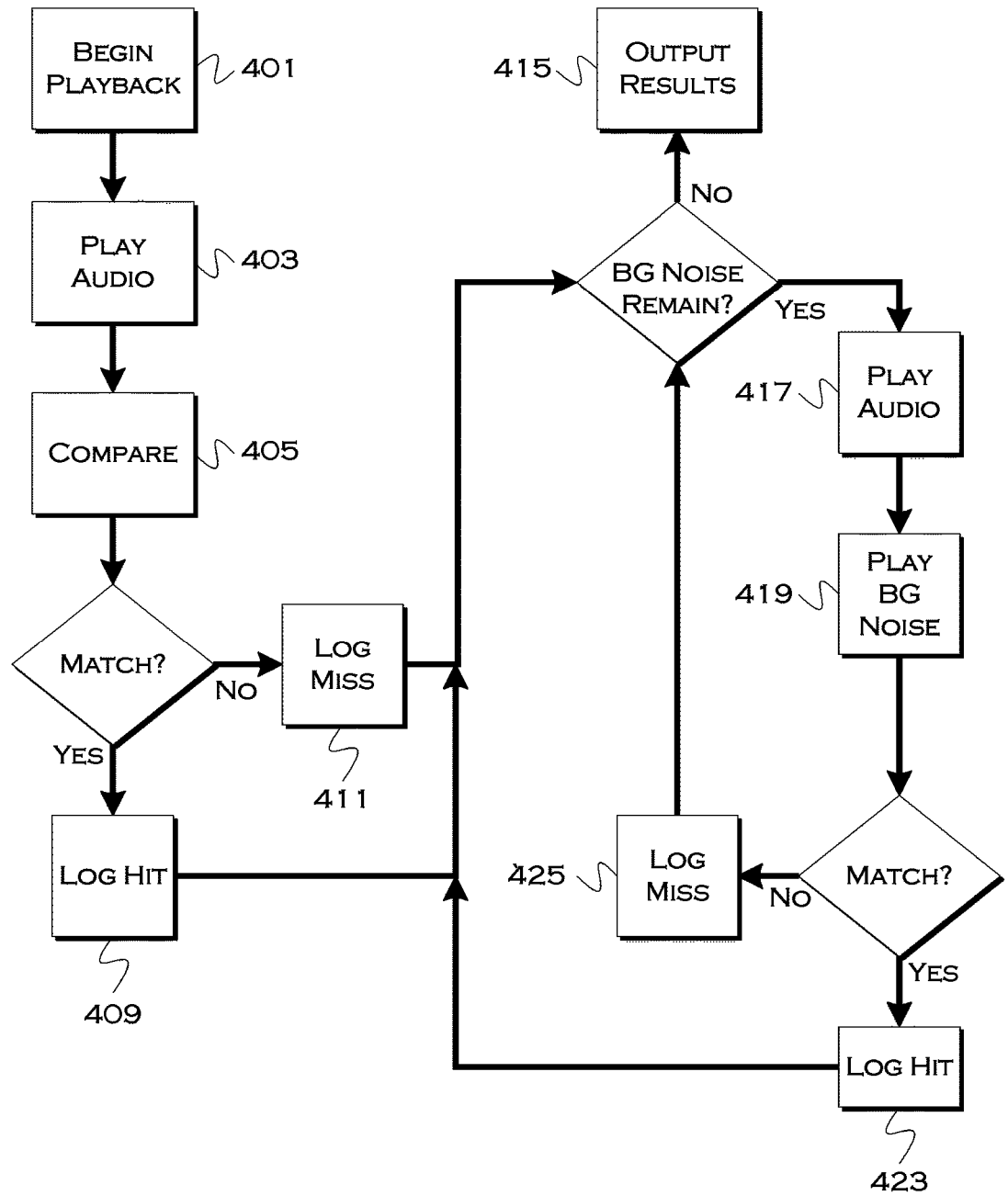
FIG. 4 shows an illustrative process for recordation of ambient noise effects.

FIG. 4 shows an illustrative process for recordation of ambient noise effects. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process begins playback 401 for a given make and/or model. The process then plays back the pre-recorded audio phrases 403 through the HATS system. The resulting captured sound from the microphone is analyzed and compared to the expected command 405. In this example, the process first plays the sound in the absence of any background noise. If there is a match 407, the hit is logged 409, otherwise a missed word is logged 411. This process can continue for all of the commands recorded on the command database.

As long as one or more sets of background noise remains 413 for a given test, the process repeats playback of the command(s) 417 and also plays the background noise 419 at the same time, in order to receive a version of the command altered by the ambient noise. If there is a match 421, the process logs the hit 423, else the process logs a miss 425. This repeats for all background noises that are to be played with a given test group. Once the process is completed for all the background noises, the process outputs the results 415.

Various sound processing techniques can be tested in specific vehicle environments for determining the specific successfulness of each technique for a given vehicle model under certain conditions. By knowing which pre and post processing techniques increase recognition reliability, the process can determine which techniques to apply under which conditions, improving the reliability of voice recognition without having to run meaningless or useless filters on every input voice command while a vehicle is in the field.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
  a head and torso simulator (HATS) system, configured to play back pre-recorded audio commands while simulating a driver head location as an output location;
  a vehicle speaker system; and
  a processor configured to:
  engage a vehicle heating, ventilation and air-conditioning (HVAC) system;
  play back audio commands through the HATS system while playing back pre-recorded vehicle environment noises through the speaker system;
  determine if the audio commands, recorded by a vehicle microphone, are recognizable in the environment noises and HVAC noises; and
  for each audio command in a set of commands, repeat the engagement, play back of commands and noises, and determination, recording the results of the determination for each audio command.

2. The system of claim 1, wherein the processor is configured to engage the HVAC system at a high setting during play back of the set of commands.

3. The system of claim 1, wherein the processor is configured to engage the HVAC system at a low setting during play back of the set of commands.

4. The system of claim 1, wherein the environment noises include noises generated when a vehicle travels on varied road surfaces.

5. The system of claim 1, wherein the environment noises include noises generated when a vehicle travels at varied speeds.

6. The system of claim 1, wherein the system further includes a cabin of a specific vehicle in elements of the system are deployed, and wherein the background noises correspond to noises generated by the specific vehicle.

7. The system of claim 1, wherein the processor is configured to apply a filter to the audio command recorded by the vehicle microphone, and determine if the filter made the audio command more or less recognizable.

8. The system of claim 7, wherein the processor is configured to store a record of effects of the filter on the audio command.

9. The system of claim 8, wherein the processor is configured to store a record of background noise conditions corresponding to a background noise playing when the filter is applied, and associate the record with the filter and the command.

10. The system of claim 8, wherein the processor is configured to store a record of an HVAC setting engaged when the filter is applied, and associate the record with the filter and the command.

* * * * *